Patented Sept. 24, 1935

2,015,145

UNITED STATES PATENT OFFICE 2,015,145

ESTER DERIVED FROM HYDROGENATED CASTOR OIL

Leo P. Hubbuch, Wilmington, Del., assignor to E. I. du Pont de Nemours & Company, Wilmington, Del., a corporation of Delaware No Drawing. Application April 11, 1932, Serial No. 604,670

13 Claims. (Cl. 260—103)

This invention relates to hydrogenated castor oil derivatives and more particularly to those derivatives useful as softening agents for nitrocellulose films.

Pyroxylin films are brittle and in order to overcome this difficulty various softening agents have been added to nitrocellulose coating compositions for the purpose of imparting flexibility to the films resulting from these coating compositions. I have found, however, that certain derivatives of hydrogenated castor oil furnish improved softening agents.

This invention has as an object the production of new compounds comprising monocarboxylic acid esters of the mono- and di-glycerides of hydrogenated castor oil. Other objects will appear hereinafter.

These objects are accomplished by the following invention in which a mixture of glycerides of hydrogenated castor oil containing the mono- and/or di-glyceride (or similar esters with other polyhydric alcohols) is reacted with a monobasic organic acid in such proportion as to yield a product, preferably a liquid oil at ordinary temperatures.

The glycerides other than the mono-glyceride mentioned above are intended to mean either the di-glyceride or a mixture of di- and mono-glycerides, with or without glycerol.

The reference herein to a glyceride of hydrogenated castor oil lower than the tri-glyceride means the glyceride, or mixture of glycerides, that is obtained by heating hydrogenated castor oil with glycerol.

Castor oil consists chiefly (about 85%) of the tri-glyceride of ricinoleic acid which may be expressed by the following formula:

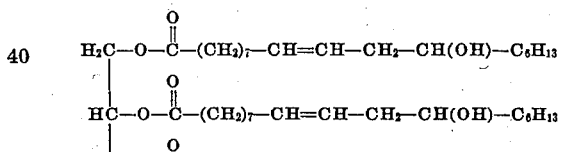

Tri-glyceride of ricinoleic acid.

Castor oil turns rancid because of oxidation which occurs at the double bonds, and when such rancidification occurs, a brittleness of the softened pyroxylin film develops. Removal of the double bonds by hydrogenation, which may be effected in the known manner by using a nickel catalyst below 200° C., converts the tri-glyceride of ricinoleic acid into the tri-glyceride of hydroxy stearic acid:

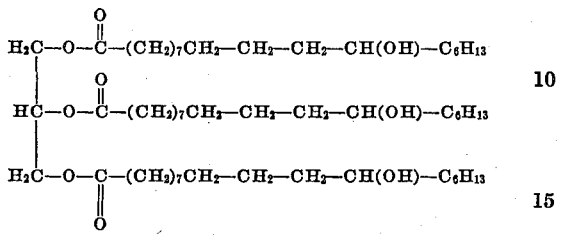

Tri-glyceride of hydroxy stearic acid.

This product, however, is a hard white wax melting at 86° C. and incompatible with nitrocellulose. Hydrogenated castor oil cannot, therefore, without further modification, be used as a film softening agent for nitrocellulose. This material still contains the hydroxyl groups originally present in the ricinoleic acid molecule.

When this material is treated with monobasic organic acids, which for the purpose of the present invention includes the esterifying derivatives of the acids such as anhydrides of the acids or acid halides, liquid products, which are readily compatible with nitrocellulose, result. My new softening agents are, however, according to the present invention, made by first forming a glyceride of hydrogenated castor oil lower than the tri-glyceride and then esterifying the hydroxyl groups of the hydroxy stearic acid radical or radicals as well as the unsubstituted hydroxyl groups of the glyceryl part of the molecule. I have found that the above mentioned esters and the mixtures thereof that may result from the reaction for their formation, are especially valuable for the purposes of the present invention. The alcoholysis step must precede the esterification but the hydrogenation can precede or follow either the alcoholysis or the esterification. These products are, preferably, made by heating the hydrogenated castor oil with varying proportions of glycerol to form mixtures containing mono- and di-glycerides, and then heating the glyceride mixture formed with the acid or anhydride in such proportion that practically all of the hydroxyl groups are esterified. Such combinations as have been mentioned above are made from proportions of the acid or anhydride and the hydroxy glyceride based upon the acid number of the acid or anhydride and the acetyl value of the hydroxy glyceride.

The following examples are given by way of illustration, and not of limitation, of the method of making these esters of the mono-, di- or mixed glycerides of hydrogenated castor oil.

Example I

A mixture of 95.8 parts of hydrogenated castor oil consisting essentially of 12-hydroxystearin, 4.0 parts of glycerol and 0.2 parts of sodium hydroxide is heated with rapid stirring at 200° C. for one-half to one and one-half hours, or until the mixture is completely homogeneous. A mixture of 69.8 parts of this di-glyceride of hydrogenated castor oil and 30.2 parts of acetic anhydride is refluxed for three hours. The acetic acid is removed from this product either by distillation and blowing with an inert gas or by washing first with water, then with a dilute solution of sodium bicarbonate, and finally again with water. It is dried by distilling benzene from it. The product is an oil very similar in physical properties to castor oil.

Example II

A mixture of 85.5 parts of hydrogenated castor oil consisting essentially of 12-hydroxystearin and 14.5 parts of glycerol are heated together with rapid stirring for four hours at 250° C. or until the sample flowed upon a glass plate appears completely homogeneous. A mixture of 49.6 parts of this mono-glyceride of hydrogenated castor oil and 50.4 parts of benzoic acid are brought to a temperature of 225° C. over a period of one and one-half to two hours, then held at this point for six hours or until the acid number reaches 15 to 20. This product is slightly darker and heavier than castor oil.

Example III

A mixture of 85.4 parts of hydrogenated castor oil consisting essentially of 12-hydroxystearin, 14.4 parts of glycerol, and 0.2 parts of sodium hydroxide is heated with rapid stirring at 200° C. for one-half to one and one-half hours, or until a sample flowed on a glass plate appears to be completely homogeneous. A mixture of 51.0 parts of this mono-glyceride of hydrogenated castor oil and 49.0 parts of acetic anhydride is refluxed for three hours. The acetic acid is removed from this product by washing first with water, then with a dilute solution of sodium bicarbonate, and finally again with water. The product is dried by distilling benzene from it. It is an oil very similar in physical characteristics to castor oil.

Example IV

A mixture of 36.3 parts of the di-glyceride of hydrogenated castor oil, prepared as in the first part of Example I, and 63.7 parts of distilled naphthenic acids is heated with or without stirring or blowing at 225° C. for eight and one-half hours, or until the acid number has reached a value of, roughly, 10.0. The product is a dark, viscous liquid. It may be used as such in coating compositions.

While the invention has, for purposes of illustration, been described in connection with glycerol, it is to be understood that the products obtained by reacting hydrogenated castor oil with other polyhydric alcohols may be esterified in a similar manner. Among the various polyhydric alcohols useful in the practice of the invention there may be mentioned sorbitol, ethylene glycol and higher glycols, diethylene glycol and other polyglycols, pentaerythritol, polyglycerols, monoethylin, monobenzylin, etc.

As typical of the large number of monocarboxylic acids from which selection may be made, the following may be mentioned: acetic, butyric, oleic, stearic, erucic, benzoic, salicylic, naphthoic, toluic, and nicotinic.

The esterification may be carried out in the presence of a non-reactive solvent such as xylene, chlorobenzene, glycol diethyl ether, etc., as described in a copending application by M. M. Brubaker, Serial No. 421,585, filed January 17, 1930.

The properties of my softening agents vary somewhat according to the acid or acids selected for the esterification of the alcoholized hydrogenated castor oil as well as the character and amount of the polyhydric alcohol used in the alcoholysis stage. When the esterification of, for example, mono- or di-glycerides of hydrogenated castor oil is effected with aliphatic acids of low molecular weight the exudation temperature, or the temperature at which the film begins to exude or sweat out the softener, is higher than when aliphatic acids of high molecular weight are used. Lauric acid, for instance, produces a softening agent of low exudation temperature, while acetic acid forms one showing a high exudation temperature. The aromatic monobasic acids produce softeners of moderately high exudation temperatures.

Mixtures of the various softening agents with or without other softening agents can be used and different ratios of softener, pyroxylin, pigment and gum and different types of nitrocellulose, gum or pigment may be used in the coating compositions as will be readily understood by those skilled in the art. Other well known catalysts such as litharge may replace the sodium hydroxide mentioned in the first part of Examples I and III.

The present invention finds its most important use in the preparation of such compositions as are used in the coating of fabrics for the production of artificial leather. The softening agents of the type disclosed herein are, however, also valuable as softening agents for various lacquer type films other than those especially adapted as a fabric coating. My products are also useful as impregnating and waterproofing agents for paper, textiles, porous stone, etc.; as lubricants; as fluids for hydraulic shock absorbers; as safety glass adhesives; and as binding materials for sheets of mica and cellulose acetate in the manufacture, respectively, of insulating materials and laminated sheet and tube products.

Although the use of my products with nitrocellulose only has been detailed, they may also be used with other cellulose derivatives, for example, cellulose acetate, propionate, aceto-butyrate, etc., ethyl, benzyl, etc., cellulose, etc., in coating, impregnating, plastic, or adhesive compositions.

The present invention is distinguised from the applications of M. M. Brubaker, Serial Nos. 604,666, and 604,665 filed of even date herewith, in that the first mentioned application deals with polybasic acid esters of hydrogenated castor oil, and the second mentioned application deals with hydrogenated fatty oil modified polyhydric alcohol-polybasic acid resins produced by reacting a polyhydric alcohol, hydrogenated castor oil, and a polybasic acid.

As many apparently widely different embodiments of this invention may be made without departing from the spirit and scope thereof, it is to be understood that I do not limit myself to the specific embodiments thereof except as defined in the following claims:

I claim:

1. An ester of an alcoholysis product obtained by heating together a polyhydric alcohol and a hydrogenated castor oil consisting essentially of 12-hydroxystearin, said ester being one in which substantially all the alcoholic hydroxyl groups of said alcoholysis product are esterified by a monocarboxylic acid.

2. An ester of an alcoholysis product obtained by heating together glycerol and a hydrogenated castor oil consisting essentially of 12-hydroxystearin, said ester being one in which substantially all the alcoholic hydroxyl groups of said alcoholysis product are esterified by a monocarboxylic acid.

3. The ester of claim 2, in which the alcoholysis product is the monoglyceride.

4. The acetate of the monoglyceride of a hydrogenated castor oil consisting essentially of 12-hydroxystearin.

5. The benzoate of the monoglyceride of a hydrogenated castor oil consisting essentially of 12-hydroxystearin.

6. The ester of claim 2, in which the alcoholysis product is the diglyceride.

7. The acetate of the diglyceride of a hydrogenated castor oil consisting essentially of 12-hydroxystearin.

8. A process for making acylated polyhydric alcohol mixed esters which comprises esterifying with a monocarboxylic acid an alcoholysis product obtained by reacting a polyhydric alcohol and a hydrogenated castor oil consisting essentially of 12-hydroxystearin, said monocarboxylic acid being used in amount sufficient to esterify substantially all the alcoholic hydroxyl groups of said alcoholysis product.

9. The process of claim 8 in which the polyhydric alcohol is glycerol.

10. The process of claim 8 in which the polyhydric alcohol is glycerol and the monocarboxylic acid is acetic.

11. A process for making acylated polyhydric alcohol mixed esters which comprises forming an alcoholysis product by heating a polyhydric alcohol with a hydrogenated castor oil consisting essentially of 12-hydroxystearin, and esterifying the product so formed with a monocarboxylic acid in amount sufficient to esterify substantially all the alcoholic hydroxyl groups of said alcoholysis product.

12. The process of claim 11 in which the polyhydric alcohol is glycerol.

13. The process of claim 11 in which the polyhydric alcohol is glycerol and the monocarboxylic acid is acetic.

LEO P. HUBBUCH.